(12) United States Patent
Chen et al.

(10) Patent No.: US 12,039,294 B2
(45) Date of Patent: Jul. 16, 2024

(54) DEVICE AND METHOD FOR HANDLING PROGRAMMING LANGUAGE FUNCTION

(71) Applicant: Realtek Semiconductor Corp., HsinChu (TW)

(72) Inventors: Yuefeng Chen, Suzhou (CN); Xuanming Liu, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 72 days.

(21) Appl. No.: 17/983,332

(22) Filed: Nov. 8, 2022

(65) Prior Publication Data

US 2023/0305816 A1    Sep. 28, 2023

(30) Foreign Application Priority Data

Mar. 24, 2022  (CN) .......................... 202210297330.6

(51) Int. Cl.
*G06F 8/30* (2018.01)

(52) U.S. Cl.
CPC ...................................... *G06F 8/31* (2013.01)

(58) Field of Classification Search
None
See application file for complete search history.

(56) References Cited

U.S. PATENT DOCUMENTS

| 10,642,616 | B2 | 5/2020 | DeHon | |
| 10,698,684 | B2* | 6/2020 | Beckett | ................... G06F 8/443 |
| 10,747,511 | B2 | 8/2020 | Radigan | |
| 2006/0190647 | A1* | 8/2006 | Asano | ................ G06F 13/4221 710/110 |
| 2017/0329578 | A1* | 11/2017 | Iscen | ....................... G06F 9/485 |

FOREIGN PATENT DOCUMENTS

TW            200620114            6/2006

OTHER PUBLICATIONS

Khoh, Soo Beng, "A Conformance Test Framework for the DeviceNet Fieldbus," Univ. of Warwick, 1996, 225pg. (Year: 1996).*
Mourelle, Luiza de Macedo, "Hardware/Software Interfacing in a Software Acceleration Environment," Univ. of Manchester, 1997, 216pg. (Year: 1997).*
Sridevi et al., "Effective Protocols for Industrial Communication," Springer, 2019, 13pg. (Year: 2019).*

\* cited by examiner

*Primary Examiner* — Ryan D. Coyer
(74) *Attorney, Agent, or Firm* — Winston Hsu (57) ABSTRACT

A processing device includes: a receiving module for receiving a configuration from a control device, wherein the configuration includes a destination address, a length, a filled value and a function type; a control module for (A) configuring an access state for accessing a slave device according to the function type and (B) comparing a counting value with the length to generate a comparison result according to the function type, determining whether data received from the slave device reaches an end to generate a determination result, or both; a reading module for reading the data according to the access state; a writing module for writing the filled value to the destination address according to information of the access state, the determination result and the comparison result; and a transmitting module for transmitting an interrupt signal to the control device according to result(s) of the determination result and the comparison result.

10 Claims, 8 Drawing Sheets

DEVICE AND METHOD FOR HANDLING PROGRAMMING LANGUAGE FUNCTION

BACKGROUND OF THE INVENTION

1. Field of the Invention

The present invention relates to a device and a method, and more particularly, to a device and a method of executing a programming language function of a control device.

2. Description of the Prior Art

In a computer system, a central processing unit (CPU) is responsible for executing programming language functions. According to the prior art, when the CPU executes programming language functions of a data set, the CPU needs to execute lines of code to repeatedly read data of a memory block and repeatedly write the data to the memory block. This can occupy a lot of processing time of the CPU and a lot of storage space of the memory, and the programming can also occupy a lot of processing space. Thus, how to make the CPU execute the programming language functions efficiently to improve both an execution speed of the programming language functions and an execution efficiency of the CPU is an important problem to be solved.

SUMMARY OF THE INVENTION

The present invention therefore provides a processing device and a method for executing a programming language function of a control device to solve the abovementioned problem.

A processing device for executing a programming language function of a control device comprises: a receiving module for receiving a configuration of the programming language function from the control device, wherein the configuration comprises a destination address, a length, a filled value and a function type; a control module, coupled to the receiving module, for performing the following steps: (A) configuring an access state for accessing a slave device according to the function type; and (B) comparing a counting value with the length to generate a comparison result according to the function type, or determining whether data received from the slave device reaches an end according to the data to generate a determination result, or generating the determination result and the comparison result; a reading module, coupled to the control module, for reading the data from the slave device according to the access state; a writing module, coupled to the control module, for writing the filled value to the destination address according to at least one information of the access state, the determination result and the comparison result; and a transmitting module, coupled to the control module, for transmitting an interrupt signal to the control device according to at least one result of the determination result and the comparison result.

A method for executing a programming language function of a control device for the above processing device is also disclosed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
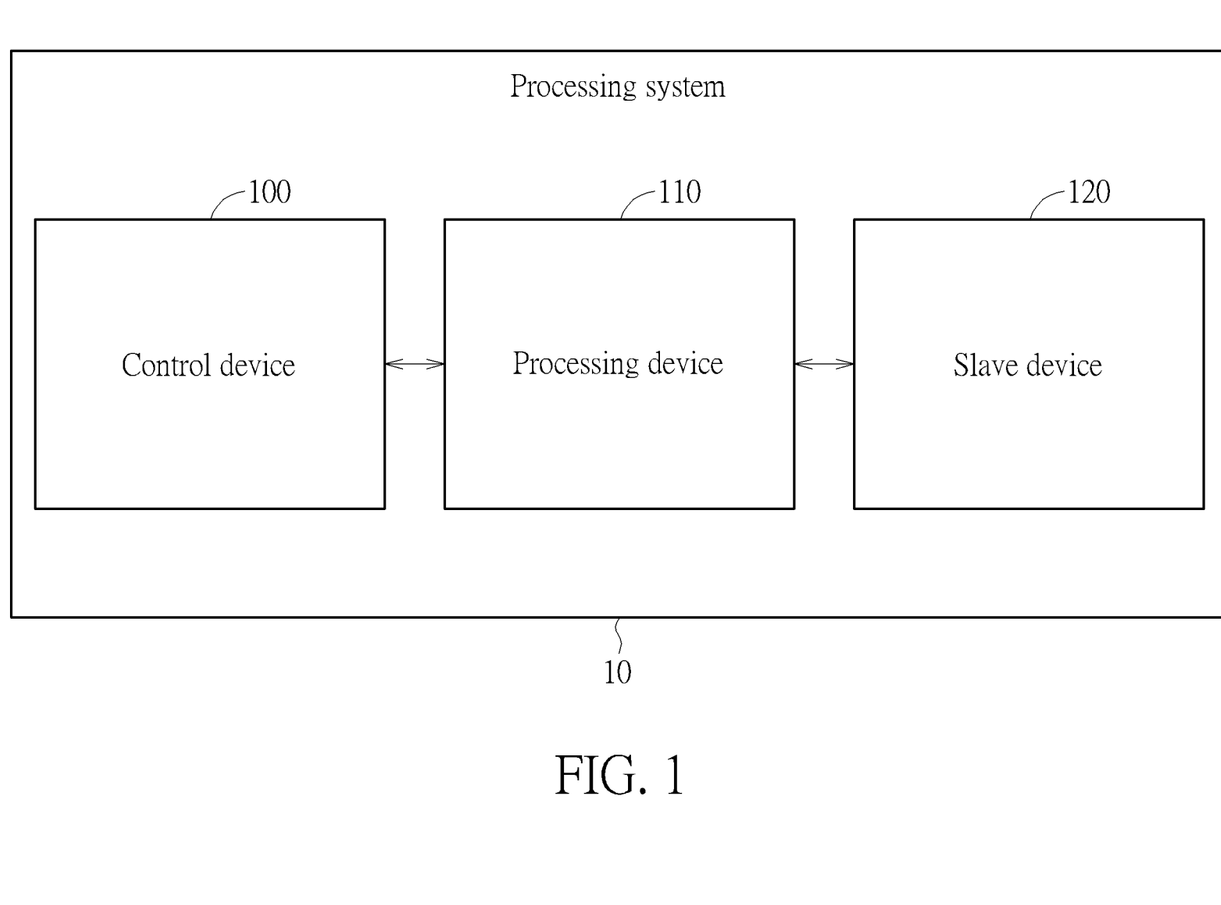
FIG. 1 is a schematic diagram of a processing system according to an example of the present invention.

FIG. 1 is a schematic diagram of a processing system 10 according to an example of the present invention. The processing system 10 may be a system on a chip (SoC), but is not limited thereto. The processing system 10 may include a control device 100, a processing device 110 and a slave device 120. The control device 100 may be a central processing unit (CPU), a master control unit (MCU) or a digital signal processor (DSP), but is not limited thereto. An instruction set architecture used by the CPU may include a CPU instruction set architecture developed according to the Intel 8086 (x86) specification, the microprocessor without interlocked pipeline stages (MIPS), the advanced reduced instruction set computing machine (ARM) or the reduced instruction set computing V (RISC-V), but is not limited thereto. The processing device 110 may include a direct memory access controller (DMAC), but is not limited thereto. The slave device 120 may include a memory controller, but is not limited thereto.

In addition, the processing system 10 may include a data exchange interface, e.g. a bus or an interconnect interface, but is not limited thereto. In one example, the data exchange interface may be connected to the control device 100, the processing device 110 and the slave device 120 at the same time. The control device 100, the processing device 110 and the slave device 120 may communicate with each other (e.g. transmit and receive data, configuration, message(s), signal(s), reading command(s), or writing command(s)) via the data exchange interface. In one example, the data exchange interface may be further connected with at least one peripheral device. The control device 100, the processing device 110, the slave device 120 and the at least one peripheral device may communicate with each other via the data exchange interface. In one example, the processing device 110 may transmit a reading command or a writing command to the slave device 120 according to a communication protocol used for the data exchange interface. The communication protocol may include the Advanced Microcontroller Bus Architecture (AMBA) protocol or the Open Core Protocol (OCP) protocol, but is not limited thereto.

In one example, the control device 100 may be a master device or a slave device of the data exchange interface. The processing device 110 may be a master device or a slave device of the data exchange interface. The slave device 120 and/or the at least one peripheral device may be a slave device of the data exchange interface. In one example, the control device 100 may configure the way in which the processing device 110 transmits a bus request according to a receiving capability of the slave device 120, e.g. a single bus request or a burst bus request, but is not limited thereto.

Figure 2:
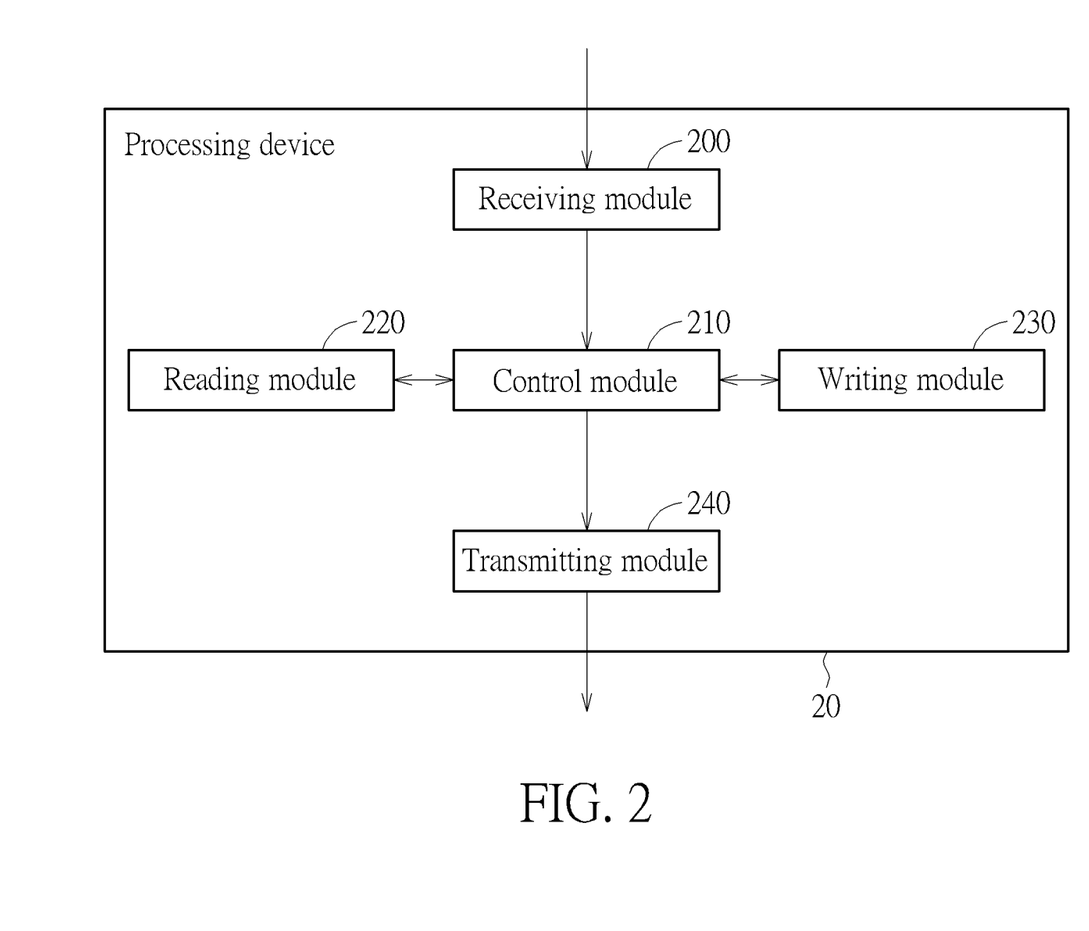
FIG. 2 is a schematic diagram of a processing device according to an example of the present invention.

FIG. 2 is a schematic diagram of a processing device 20 according to an example of the present invention, and may be utilized to implement the processing device 110 of FIG. 1 for executing a programming language function of the control device 100. The processing device 20 may include a receiving module 200, a control module 210, a reading module 220, a writing module 230 and a transmitting module 240. The receiving module 200 may receive configuration of the programming language function from the control device (e.g. the control device 100 in FIG. 1), wherein the configuration may include (e.g. indicate) a destination address, a length (e.g. data length), a filled value and a function type. The control module 210 may be coupled to the receiving module 220, and may perform the following steps: (A) The control module 210 may configure an access state for accessing a slave device (e.g. the slave device 120 in FIG. 1) according to the function type; and (B) The control module 210 may compare a counting value with the length to generate a comparison result according to the function type, or the control module 210 may determine whether data received from the slave device reaches an end according to the data to generate a determination result, or both (i.e. the control module 210 may determine whether the data received from the slave device reaches the end to generate the determination result and may compare the counting value with the length to generate the comparison result). The reading module 220 may be coupled to the control module 210. The reading module 220 may read the data from the slave device according to the access state. The writing module 230 may be coupled to the control module 210. The writing module 230 may write the filled value to the destination address according to at least one information of the access state, the determination result and the comparison result. The transmitting module 240 may be coupled to the control module 210. The transmitting module 240 may transmit an interrupt signal to the control device according to at least one result of the determination result and the comparison result. By configuring the processing device 20 to execute the programming language function of the control device, the control device may execute other programming language functions. In one example, the control device may process the interrupt signal to complete processes related to the programming language function, when receiving the interrupt signal.

In one example, after receiving the configuration of the programming language function from the control device and enabling the configuration of the processing device 20, the processing device 20 may execute the programming language function of the control device. In one example, when the control device executes the programming language function, the control device (e.g. the control device 100 in FIG. 1) may convert the programming language function to machine codes according to an instruction set architecture used by the control device via a compiler to generate the configuration.

In one example, the processing device 20 may include at least one register (not shown in the figures). The register may be coupled to the receiving module 200, and may include a register for storing the destination address (e.g. a DAR register), a register for storing a length (e.g. a Block_TS register), a register for storing filled values (e.g. Fill_Value register) and a register for storing function types (e.g. Func_Type register), to store the configuration. In one example, the control module 210 may be coupled to the register to perform the above steps (A) and (B) according to the configuration in the register.

In one example, the processing device 20 may include a first in first out (FIFO) register (not shown in the figures). The FIFO register may be coupled to the reading module 220 and the writing module 230. In one example, the reading module 220 may transmit a reading command to the slave device (e.g. the slave device 120 in FIG. 1) via the transmitting module 240. The slave device may read data in the destination address according to the reading command, and may transmit the data to the processing device 20. The processing device 20 may store the data in the FIFO register. In one example, the writing module 230 may transmit a writing command and data to the slave device via the transmitting module 240. The slave device may write the data to the destination address according to the writing command.

In one example, the control module 210 may configure the access state for accessing the slave device as enabling the writing module 230 (e.g. to the writing module 230), when the function type includes (e.g. is) a first function for configuring a memory. The first function may include the memset in the C language, but is not limited thereto.

In one example, the control module 210 may configure the access state for accessing the slave device as enabling the reading module 220 (e.g., to the reading module 220) and the writing module 230 (e.g., to the writing module 230), when the function type includes (e.g. is) a second function for configuring a string. The second function may include the strset or strnset in the C language, but is not limited thereto.

In one example, the reading module 220 may transmit the reading command to the slave device via the transmitting module 240 when the access state is enabling the reading module 220. According to the reading command, the slave device may read the data in the destination address and transmit the data to the processing device 20. The processing device 20 may perform the above step (B) on the data via the control module 210.

In one example, the data may include at least one character of a string. In one example, the control module 210 may determine that the data reaches the end when the data is an empty character (i.e. '\0'). In one example, the counting value may be reset to a value of 0 when the processing device 20 completes executing the programming language function of the control device, but is not limited thereto.

In one example, the control module 210 may compare the counting value with the length to generate the comparison result when the function type includes the first function. In one example, the control module 210 may determine whether the data received from the slave device reaches the end according to the data to generate the determination result when the function type includes the strset of the second function. In one example, the control module 210 may compare the counting value with the length to generate the comparison result or may determine whether the data reaches the end to generate the determination result when the function type includes the strnset of the second function.

In one example, the control module 210 may receive a writing response message from the slave device in response to writing the filled value to the destination address. In one example, the control module 210 may update the counting value (e.g. increment the counting value by 1) and the destination address according to the writing response message. In addition, the control module 210 may repeatedly perform the step (B) until the determination result indicates that the data reaches the end or the comparison result indicates that the counting value is equal to the length.

In one example, the writing module 230 may write the filled value to the destination address (e.g. via the transmitting module 240) when the comparison result indicates that the counting value is smaller than the length. In detail, the writing module 230 may write the writing command and the filled value to the slave device (e.g. the slave device 120 in FIG. 1) via the transmitting module 240. The slave device may write the filled value to the destination address according to the writing command. In one example, the transmitting module 240 may transmit the interrupt signal to the control device (e.g. the control device 100 in FIG. 1) when the comparison result indicates that the counting value is equal to (or greater than) the length.

In one example, the writing module 230 may write the filled value to the destination address (e.g. via the transmitting module 240) when the determination result indicates that the data does not reach the end. In detail, the writing module 230 may write the writing command and the filled value to the slave device (e.g. the slave device 120 in FIG. 1) via the transmitting module 240. The slave device may write the filled value to the destination address according to the writing command. In one example, the transmitting module 240 may transmit the interrupt signal to the control device (e.g. the control device 100 in FIG. 1) when the determination result indicates that the data reaches the end.

In one example, the writing module 230 may write the filled value to the destination address (e.g. via the transmitting module 240) when the determination result indicates that the data does not reach the end and the comparison result indicates the counting value is smaller than the length. In detail, the writing module 230 may write the writing command and the filled value to the slave device (e.g. the slave device 120 in FIG. 1) via the transmitting module 240. The slave device may write the filled value to the destination address according to the writing command.

Figure 3:
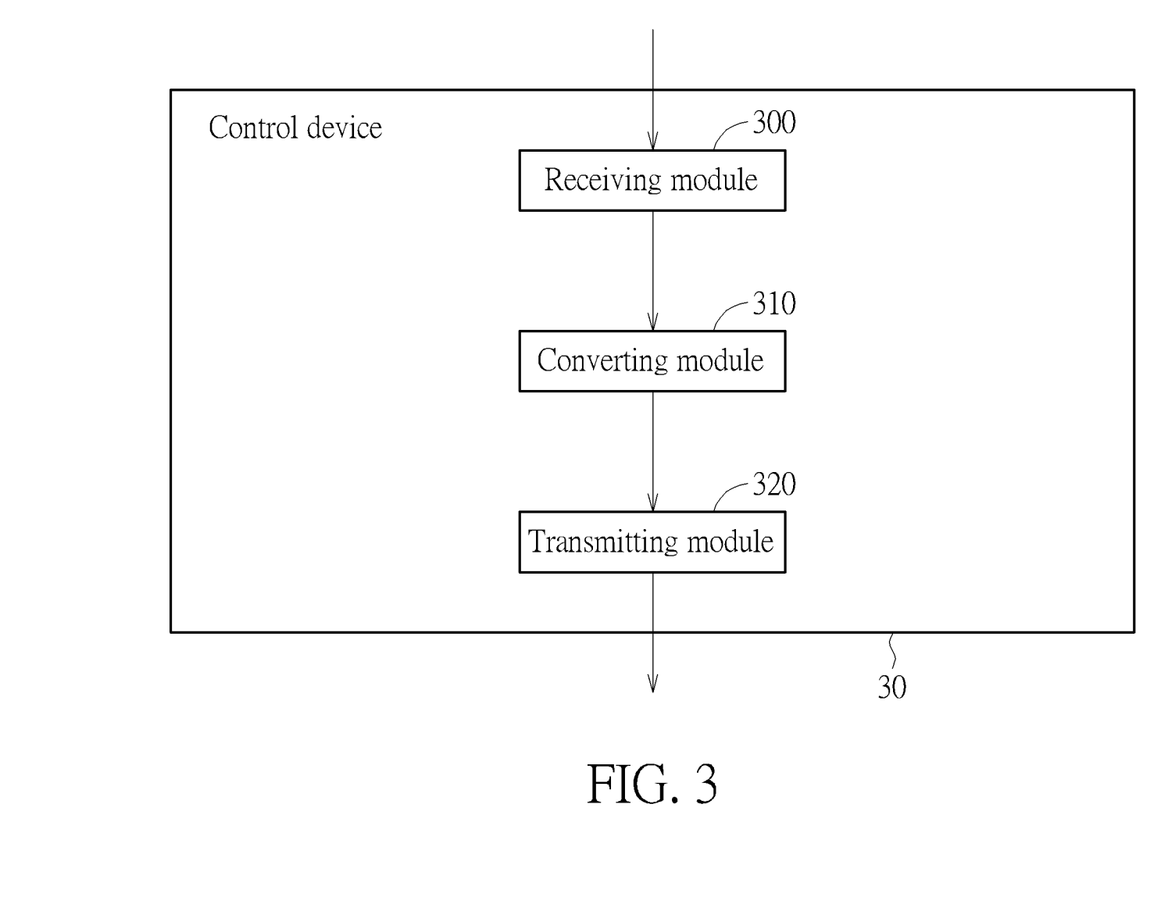
FIG. 3 is a schematic diagram of a control device according to an example of the present invention.

FIG. 3 is a schematic diagram of a control device 30 according to an example of the present invention. The control device 30 may be utilized to implement the control device 100 of FIG. 1. The control device 30 may include a receiving module 300, a converting module 310 and a transmitting module 320. The receiving module 300 may receive an interrupt signal or an address converting request message from a processing device (e.g. the processing device 110 in FIG. 1). The address converting request message may include a destination address. The converting module 310 may be coupled to the receiving module 300. The converting module 310 may convert the destination address (e.g. by a logic of segment mapping) to generate at least one converted address according to the address converting request message. The transmitting module 320 may be coupled to the converting module 310. The transmitting module 320 may transmit an address converting response message to the processing device. The address converting response message may include the at least one converted address. In one example, the converting module 310 may include (e.g. be) a memory management unit (MMU), but is not limited thereto.

In one example, the destination address may include a virtual address, and the converted destination address may include a physical address. That is, the converting module 310 may convert the virtual address to at least one physical address. In one example, the processing device may transmit the address converting request message to the control device 30 when the configuration received by the processing device includes (e.g. indicates) that a size of the destination address is greater than a threshold (e.g. 4000 Bytes). In one example, the processing device may continue to execute the programming language function of the control device 30 when the at least one converted address from the control device 30 is received.

Figure 4:
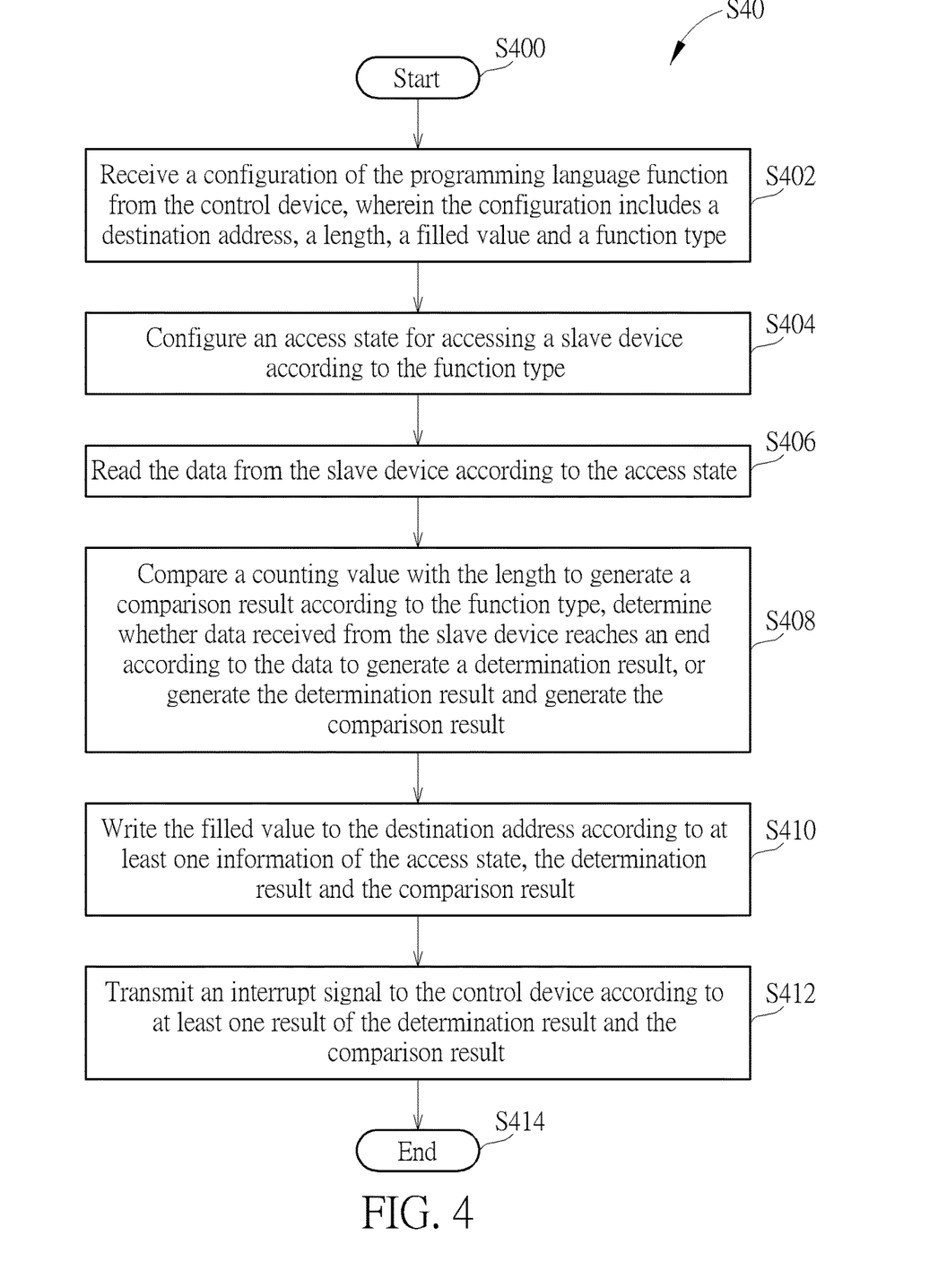
FIG. 4 is a flowchart of a process according to an example of the present invention.

Operations of the processing device 20 in the above examples can be summarized into a process S40 shown in FIG. 4, which includes the following steps:

Step S400: Start of the flow.

Step S402: A configuration of the programming language function from the control device (e.g. the control device 100) is received, wherein the configuration includes a destination address, a length, a filled value and a function type.

Step S404: An access state for accessing a slave device (e.g. the slave device 120) is configured according to the function type.

Step S406: The data from the slave device is read according to the access state.

Step S408: A counting value is compared with the length to generate a comparison result according to the function type, determine whether data received from the slave device reaches an end according to the data to generate a determination result, or generate the determination result and generate the comparison result.

Step S410: The filled value is written to the destination address according to at least one information of the access state, the determination result and the comparison result.

Step S412: An interrupt signal is transmitted to the control device according to at least one result of the determination result and the comparison result.

Step S414: End of the flow.

A detailed description and variations of the process S40 can be understood by referring to the above description, and are not narrated herein.

Figure 5:
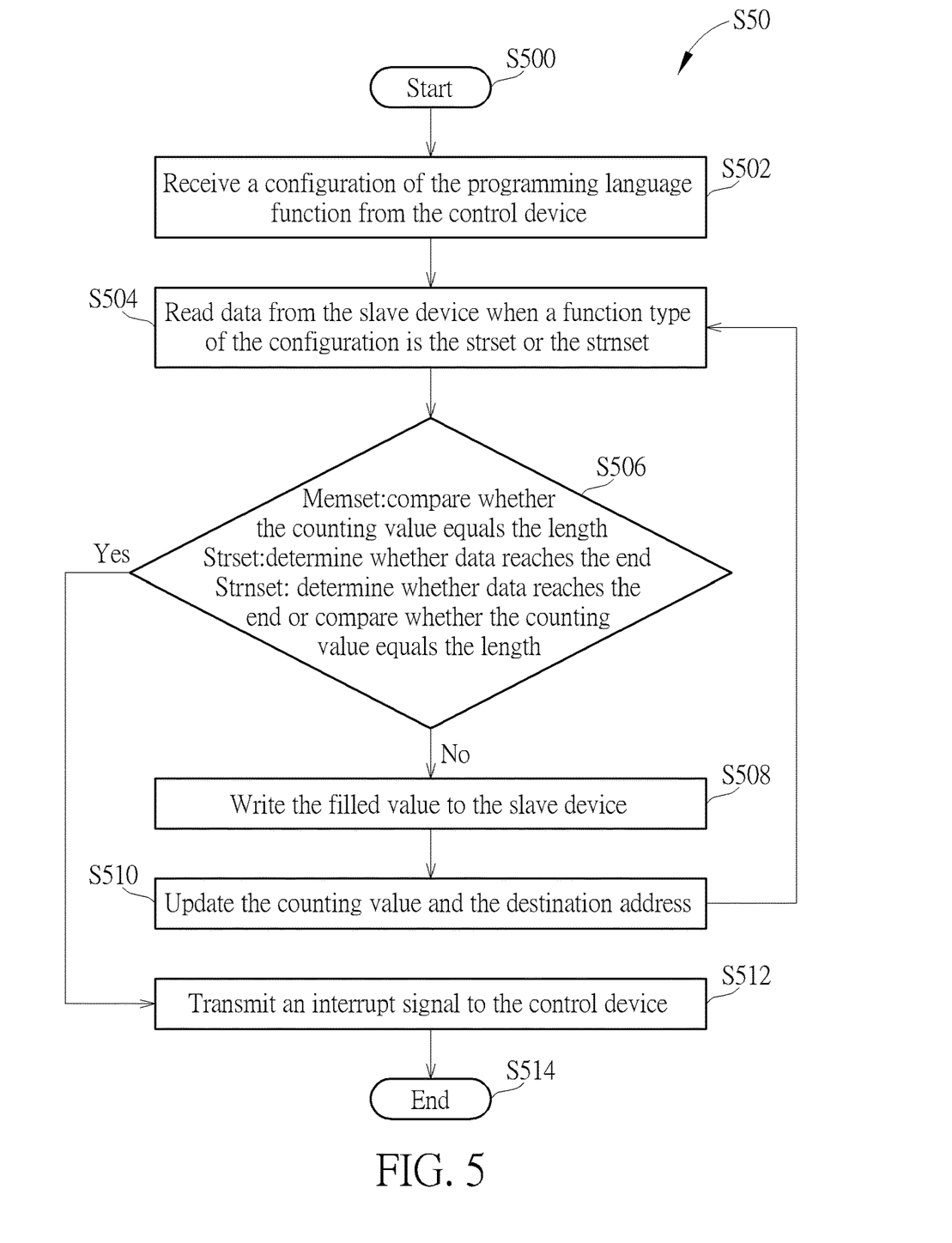
FIG. 5 is a flowchart of a process according to an example of the present invention.

Operations of the processing device 20 executing the programming language function of the control device 100 in the above examples can be summarized into a process S50 shown in FIG. 5, which includes the following steps:

Step S500: Start of the flow.

Step S502: A configuration of the programming language function is received from the control device 100.

Step S504: Data from the slave device 120 is read when a function type of the configuration is the strset or the strnset.

Step S506: The writing module 230 is enabled and whether the counting value equals the length is compared when the function type is the memset; if yes, Step S512 is performed, and if not, Step S508 is performed via the writing module 230; the reading module 220 and the writing module 230 are enabled and whether the data reaches the end is determined when the function type is the strset; if yes, Step S512 is performed, and if not, Step S508 is performed via the writing module 230; whether the data reaches the end is determined or whether the counting value equals the length is compared when the function type is the strnset; if yes, Step S512 is performed, if both not, Step S508 is performed via the writing module 230.

Step S508: The filled value is written to the slave device 120.

Step S510: The counting value and the destination address are updated, and return to Step S504.

Step S508: An interrupt signal is transmitted to the control device 100.

Step S514: End of the flow.

A detailed description and variations of the process S50 can be understood by referring to the above description, and are not narrated herein.

Figure 6:
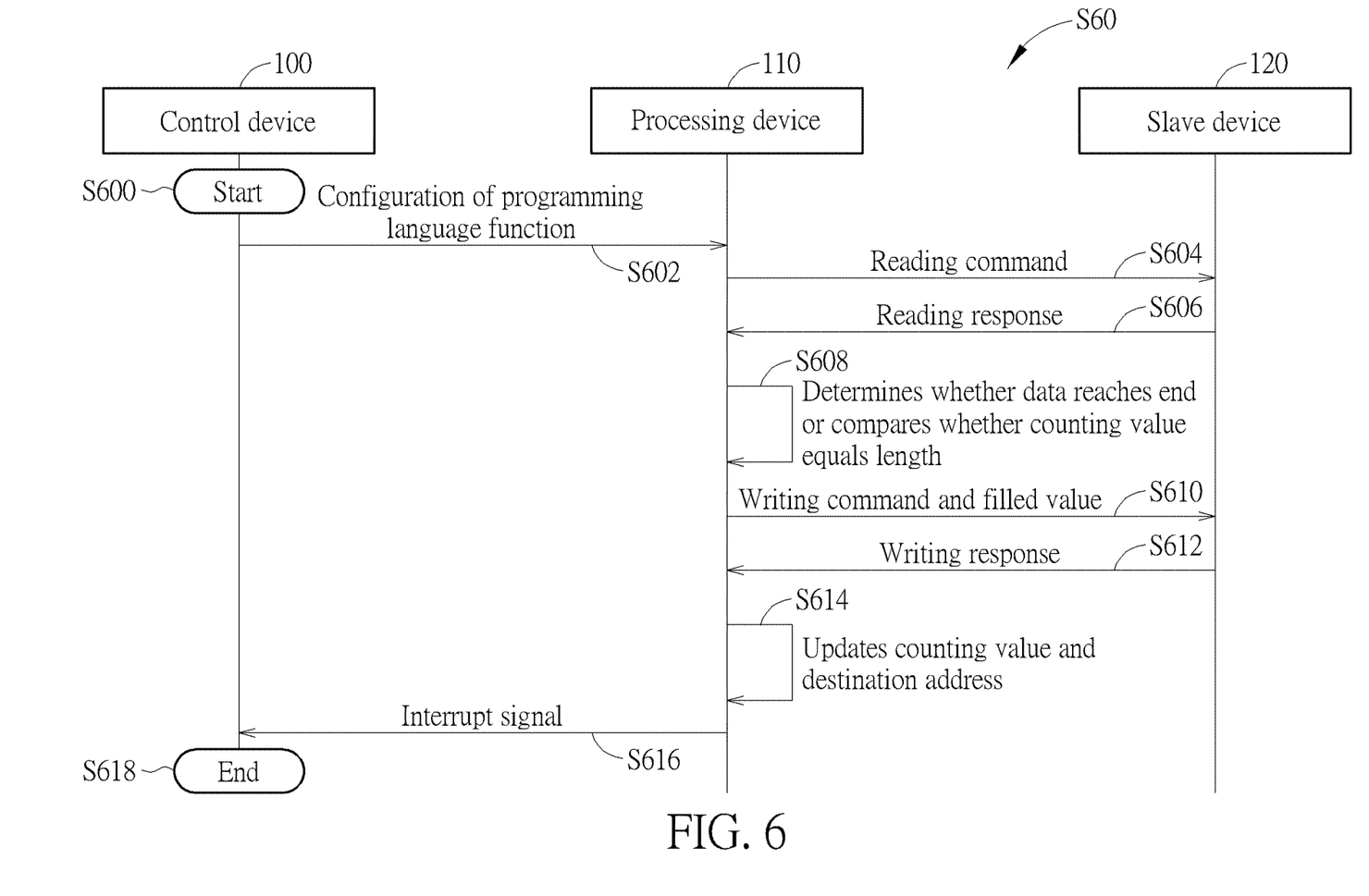
FIG. 6 is a flowchart of a process according to an example of the present invention.

Operations of the control device 100, the processing device 110 and the slave device 120 in the above examples can be summarized into a process S60 shown in FIG. 6, which includes the following steps:

Step S600: Start of the flow.

Step S602: A configuration of the programming language function is transmitted from the control device 100 to the processing device 110.

Step S604: A reading command is transmitted from the processing device 110 to the slave device 120.

Step S606: A reading response message is transmitted from the slave device 120 to the processing device 110.

Step S608: Whether the data reaches the end is determined by the processing device 110 or whether the counting value equals the length is compared by the processing device 110.

Step S610: A writing command and the filled value are transmitted from the processing device 110 to the slave device 120.

Step S612: A writing response message is transmitted from the slave device 120 to the processing device 110.

Step S614: The counting value and the destination address are updated by the processing device 110.

Step S616: An interrupt signal is transmitted from the processing device 110 to the control device 100.

Step S618: End of the flow.

According to the process S60, Steps S604-S614 do not involve the operation of the control device 100. That is, the control device 100 may execute other programming language functions during Steps S604-S614.

A detailed description and variations of the process S60 can be understood by referring to the above description, and are not narrated herein.

Figure 7:
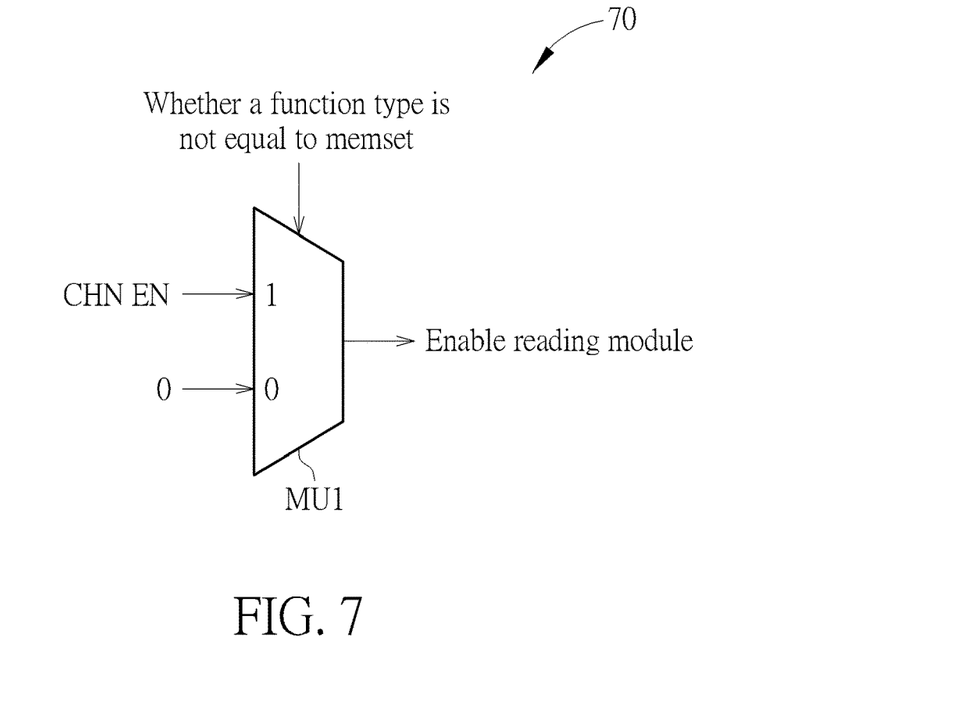
FIG. 7 is a circuit diagram of a control module enabling a reading module according to an example of the present invention.

FIG. 7 is a circuit diagram 70 of a control module 210 enabling a reading module 220 according to an example of the present invention. The circuit diagram 70 may include a multiplexer MU1. The multiplexer MU1 may include a selected control input terminal, which may be used for receiving a determination result of the control module 210 determining a condition of "whether a function type is not equal to memset" (e.g. a signal "1" is received when the determination result is true, and a signal "0" is received when the determination result is false). In addition, the multiplexer MU1 may include an output terminal coupled to the reading module 220, a first input terminal used for receiving an enabling signal "CHN EN" used for enabling the reading module 220 (which may be regarded as the enabling signal used for enabling the processing device 20), and a second input terminal used for receiving the signal "0". In one example, the selected control input terminal receives the signal "1", i.e. the multiplexer MU1 selects the enable signal "CHN EN" of the first input terminal to output, when the determination result is that the function type is not equal to memset. Accordingly, the reading module 220 is enabled. In one example, the selected control input terminal receives the signal "0", i.e. the multiplexer MU1 selects the signal "0" of the second input terminal to output, when the determination result is that the function type is equal to memset. Accordingly, the reading module 220 is not enabled. The above enabling signal "CHN EN" for enabling the reading module 220 may be the enabling signal for enabling the processing device 20. That is, the reading module 220 is enabled when the function type is not equal to memset and the processing device 20 is enabled. In addition, the above enabling signal for enabling the processing device 20 may be the enabling signal for enabling the writing module 230. That is, the writing module 230 is enabled regardless of the function type (i.e. when the function type is equal to any of the above function types), and the processing device 20 is enabled.

Figure 8:
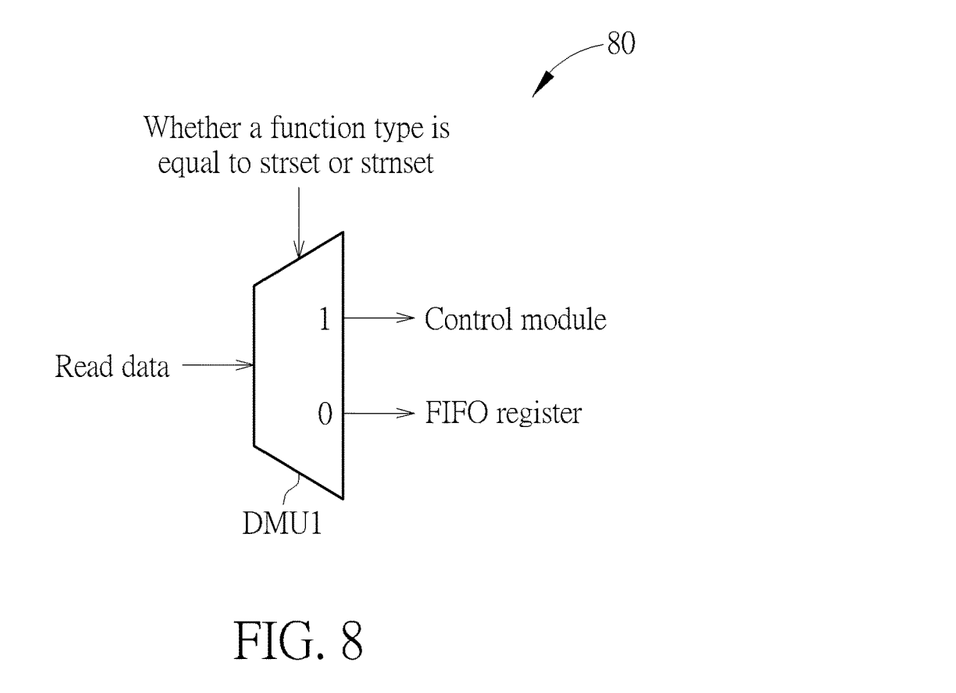
FIG. 8 is a circuit diagram of a reading module reading a path of data according to an example of the present invention.

FIG. 8 is a circuit diagram 80 of a reading module 220 reading a path of data according to an example of the present invention. The circuit diagram 80 may include a demultiplexer DMU1. The demultiplexer DMU1 may include a selected control input terminal, which may be used for receiving a determination result of the control module 210 determining a condition of "whether a function type is equal to strset or strnset" (e.g. a signal "1" is received when the determination result is false, and a signal "0" is received when the determination result is true). In addition, the demultiplexer DMU1 may include an input terminal used for receiving a signal "read data", a first output terminal coupled to the control module 210 and a second output terminal coupled to a FIFO register. The first output terminal and the second output terminal output the signal "read data" to the control module 210 and the FIFO register, respectively. In one example, the selected control input terminal receives the signal "1", i.e. the demultiplexer DMU1 selects the first output terminal to output the signal "read data" when the determination result is that the function type is equal to strset or strnset. Accordingly, the reading module 220 may output the signal "read data" to the control module 210, to read data of the control module 210. In one example, the selected control input terminal receives the signal "0", i.e. the demultiplexer DMU1 selects the second output terminal to output the signal "read data" when the determination result is that the function type is not equal to strset or strnset. Accordingly, the reading module 220 may output the signal "read data" to the FIFO register to read data of the FIFO register.

Figure 9:
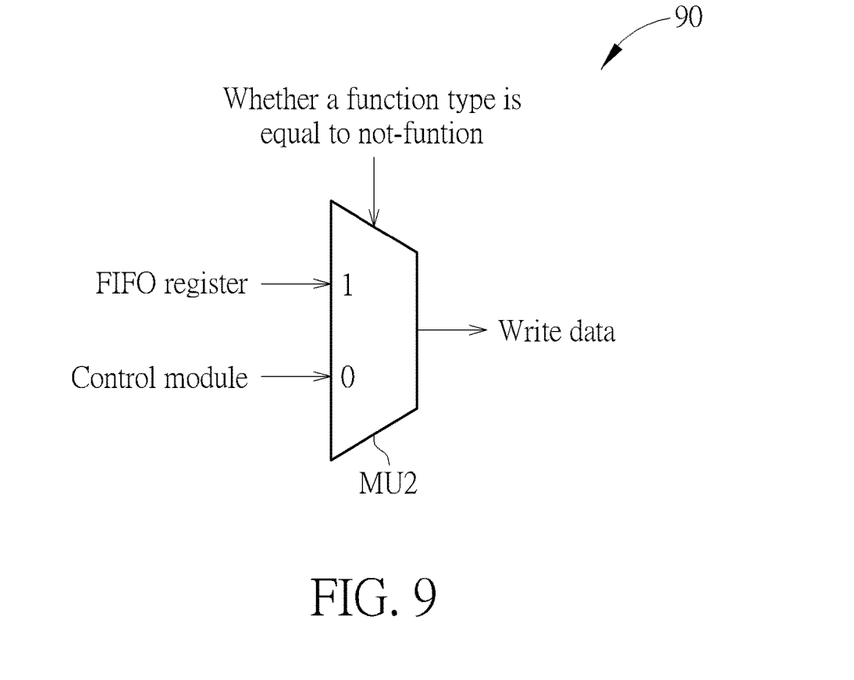
FIG. 9 is a circuit diagram of a writing module writing a path of data according to an example of the present invention.

FIG. 9 is a circuit diagram 90 of a writing module 230 writing a path of data according to an example of the present invention. The circuit diagram 90 may include a multiplexer MU2. The multiplexer MU2 may include a selected control input terminal, which may be used for receiving a determination result of the control module 210 determining a condition of "whether a function type is equal to not-function" (e.g. a signal "1" is received when the determination result is true, and a signal "0" is received when the determination result is false). In addition, the multiplexer MU2 may include an output terminal coupled to the writing module 230, a first input terminal used for receiving a signal "FIFO register", and a second input terminal used for receiving a signal "control module". In one example, the selected control input terminal receives the signal "1", i.e. the multiplexer MU2 selects the signal "FIFO register" of the first input terminal to write data when the determination result is that the function type is equal to the not-function. Accordingly, the writing module 230 may write the data of the FIFO register to the slave device (e.g. the slave device 120). In one example, the selected control input terminal receives the signal "0" when the determination result is that the function type is not equal to the not-function, i.e. the multiplexer MU2 selects the signal "control module" of the second input terminal to write data. Accordingly, the writing module 230 may write the data of the control module (i.e. the filled value) to the slave device.

Figure 10:
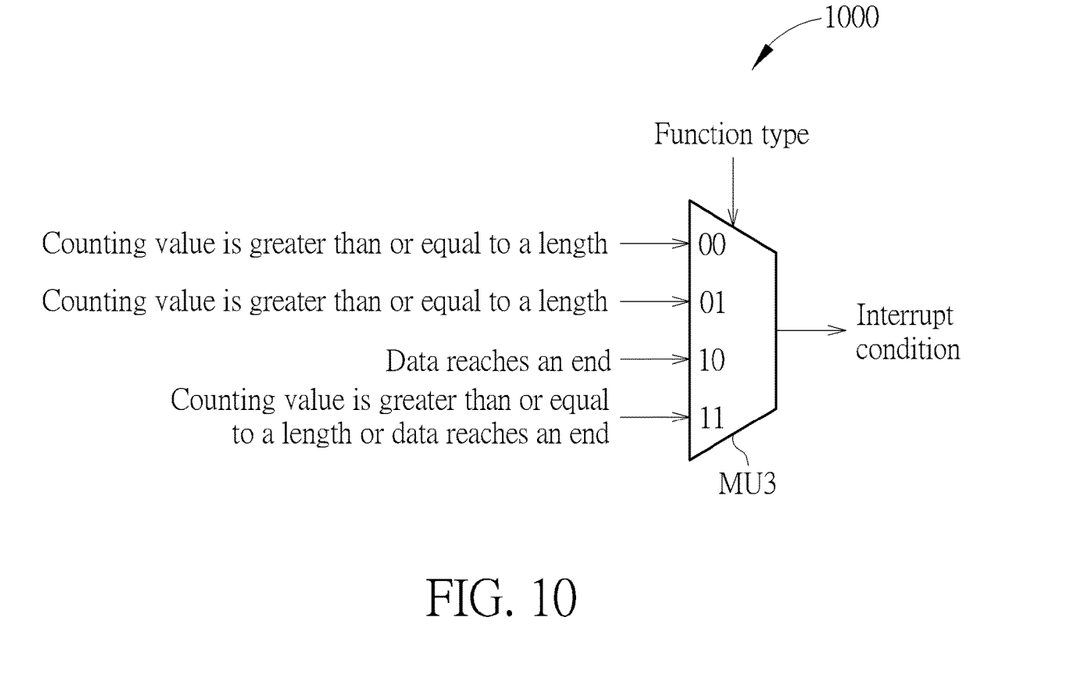
FIG. 10 is a circuit diagram of a control module determining an interrupt condition according to a function type according to an example of the present invention.

FIG. 10 is a circuit diagram 1000 of a control module 210 determining an interrupt condition according to a function type according to an example of the present invention. The circuit diagram 1000 may include a multiplexer MU3. The multiplexer MU3 may include a selected control input terminal, which may be used for receiving a "function type" determined by the control module 210 (e.g. a signal "00" is received when the function type is non-function, a signal "01" is received when the function type is memset, a signal "10" is received when the function type is strset, and a signal "11" is received when the function type is strnset). In addition, the multiplexer MU3 may include an output terminal used for outputting an "interrupt condition", a first input terminal and a second input terminal used for receiving a signal "a counting value is greater than or equal to a length", a third input terminal used for receiving a signal "data reaches an end", and a fourth input terminal used for receiving a signal "a counting value is greater than or equal to a length or data reaches an end".

In one example, the selected control input terminal receives the signal "01", i.e. the multiplexer MU3 selects the signal of the second input terminal "a counting value is greater than or equal to a length" as the output when the function type is memset. Accordingly, the control module 210 may determine the interrupt condition is "a counting value is greater than or equal to a length". In one example, the selected control input terminal receives the signal "11", i.e. the multiplexer MU3 selects the signal of the fourth input terminal "a counting value is greater than or equal to a length or data reaches an end" as the output when the function type is strnset. Accordingly, the control module 210 may determine the interrupt condition is "a counting value is greater than or equal to a length or data reaches an end". The method of determining the interrupt condition of the function type as the non-function or the strnset may be understood by referring to the above description, and is not repeated herein.

In the above examples, the term "determine" may be replaced by "compute", "calculate", "obtain", "generate", or "output". The above "according to" may be replaced by "via" or "by using". The term "include" may be replaced by "is".

It should be noted that realizations of the processing device 20, the control device 30 or the modules therein are various. For example, the modules in the above device may be integrated into one or more modules. In addition, the processing device 20, the control device 30 (or the modules therein) may be realized by hardware (e.g. circuits), software, firmware (known as a combination of a hardware device, computer instructions and data that reside as read-only software on the hardware device), an electronic system or a combination of the devices mentioned above, but is not limited thereto.

To sum up, the present invention provides a processing device 20 for executing the programming language function of the control device 30, in order to reduce the processing time of the CPU, reduce the storage space of the memory, and reduce the processing space for programming. Thus, the CPU executes the programming language functions efficiently and the execution speed of the programming language function is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A processing device, for executing a programming language function of a control device, comprising:
   a receiving module, for receiving a configuration of the programming language function from the control device, wherein the configuration comprises a destination address, a length, a filled value and a function type;
   a control module, coupled to the receiving module, for performing the following steps:
   (A) configuring an access state for accessing a slave device according to the function type; and
   (B) comparing a counting value with the length to generate a comparison result according to the function type, or determining whether data received from the slave device reaches an end according to the data to generate a determination result, or generating the determination result and generating the comparison result;
   a reading module, coupled to the control module, for reading the data from the slave device according to the access state;
   a writing module, coupled to the control module, for writing the filled value to the destination address according to at least one information of the access state, the determination result and the comparison result; and
   a transmitting module, coupled to the control module, for transmitting an interrupt signal to the control device according to at least one result of the determination result and the comparison result.

2. The processing device of claim 1, wherein the step (A) comprises:
   configuring the access state as enabling the writing module when the function type comprises a first function for configuring a memory; and
   configuring the access state as enabling the reading module and the writing module when the function type comprises a second function for configuring a string.

3. The processing device of claim 2, wherein the step (B) comprises:
   comparing the counting value with the length to generate the comparison result when the function type comprises the first function; and
   determining whether the data received from the slave device reaches the end according to the data to generate the determination result or generating the determination result and generating the comparison result, when the function type comprises the second function.

4. The processing device of claim 1, wherein the control module further performs the following steps:
   receiving a writing response message from the slave device in response to writing the filled value to the destination address;
   updating the counting value and the destination address according to the writing response message; and
   performing the step (B) repeatedly, until the determination result indicates that the data reaches the end or the comparison result indicates that the counting value is equal to the length.

5. The processing device of claim 1, wherein the writing module writes the filled value to the destination address when the comparison result indicates that the counting value is smaller than the length.

6. The processing device of claim 1, wherein the transmitting module transmits the interrupt signal to the control device when the comparison result indicates that the counting value is equal to the length.

7. The processing device of claim 1, wherein the writing module writes the filled value to the destination address when the determination result indicates that the data does not reach the end.

8. The processing device of claim 1, wherein the transmitting module transmits the interrupt signal to the control device when the determination result indicates that the data reaches the end.

9. The processing device of claim 1, wherein the writing module writes the filled value to the destination address when the determination result indicates that the data does not reach the end and the comparison result indicates the counting value is smaller than the length.

10. A method for executing a programming language function of a control device for a processing device, comprising:

receiving a configuration of the programming language function from the control device, wherein the configuration comprises a destination address, a length, a filled value and a function type;

configuring an access state for accessing a slave device according to the function type;

reading data from the slave device according to the access state;

comparing a counting value with the length to generate a comparison result according to the function type, or determining whether the data received from the slave device reaches an end according to the data to generate a determination result, or generating the determination result and generating the comparison result;

writing the filled value to the destination address according to at least one information of the access state, the determination result and the comparison result; and transmitting an interrupt signal to the control device according to at least one result of the determination result and the comparison result.

* * * * *